United States Patent [19]

Miles et al.

[11] 4,373,511
[45] Feb. 15, 1983

[54] COOKING VESSEL

[76] Inventors: Derek A. Miles; Julie M. T. Miles, both of Quinta da Pena Rau da Pena, 4100 Porto, Portugal

[21] Appl. No.: 153,606

[22] Filed: May 27, 1980

[51] Int. Cl.³ .............................................. F24D 1/00
[52] U.S. Cl. .................... 126/369; 126/377; 220/428; 99/467
[58] Field of Search ............ 126/369, 377, 382, 369.1, 126/369.2; 220/428; 219/440; 99/347, 532, 533, 467, 483

[56] References Cited

U.S. PATENT DOCUMENTS

| 372,416 | 11/1887 | Hurst | 126/369 |
|---|---|---|---|
| 1,003,112 | 9/1911 | Johnson | 126/377 |
| 1,209,752 | 12/1916 | Pantlik | 126/377 |
| 1,263,004 | 4/1918 | Tollagsen | 126/369 |
| 1,334,930 | 3/1920 | Chadwick | 126/377 |
| 1,673,164 | 6/1928 | Silen | 126/369 |
| 2,088,319 | 7/1937 | Comstock | 126/377 |
| 2,628,738 | 2/1953 | Hilldale | 126/369 X |
| 3,053,166 | 9/1962 | Ashley | 126/369 X |
| 3,141,455 | 7/1964 | Dumbeck | 126/369 |

FOREIGN PATENT DOCUMENTS

| 88681 | 3/1921 | Switzerland | 126/376 |
|---|---|---|---|
| 106942 | 6/1917 | United Kingdom | 126/369 |

Primary Examiner—Samuel Scott
Assistant Examiner—Randall L. Green
Attorney, Agent, or Firm—Maky, Renner, Otto & Boisselle

[57] ABSTRACT

A cooking vessel for oven cooking comprises an outer vessel, an inner vessel and a lid all preferably of ceramic material. The inner vessel is supported on supports above a well of the outer vessel containing water and is so shaped and located with respect to the outer vessel as to form an annular gap therebetween communicating through passages with the well. The sidewall of the inner vessel is inclined inwardly at its upper end and forms with a downwardly depending circumferential ridge of the lid a continuation of the gap with a spatial increase beneath the ridge. In operation and when the cooking vessel is heated in an oven, water vapor from the water circulates in paths immediately beneath the lid and through the gap and further water vapor from food within the inner vessel moves in paths beneath said paths without undue mixing of the water vapor and the further water vapor.

15 Claims, 6 Drawing Figures

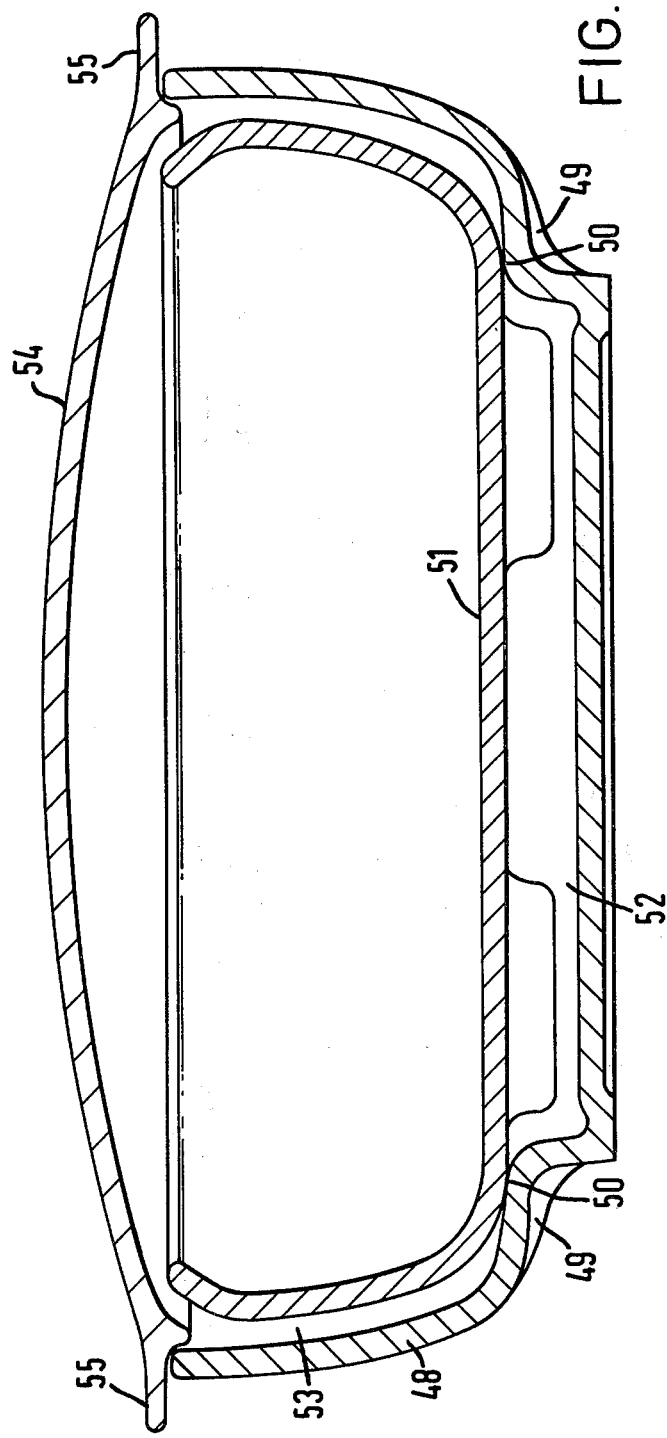

COOKING VESSEL

The invention relates to a cooking vessel and in particular to a cooking vessel for cooking food in a normal oven whereby the food is protected from direct heat and retains its moisture, flavour and food value.

BACKGROUND AND SUMMARY OF THE INVENTION

Utensils exist, either being proprietary products or adaptions of well known cooking devices, for steam cooking of food or otherwise cooking of food in a closed container.

Steam cooking devices usually comprise a perforated food container placed on or within a receptacle containing water and designed so that when said water is heated the steam produced passes around and/or through the food to cook it. This method of cooking suffers from the fact that much of the flavour and food value is extracted by the steam and lost in the re-condensed water.

Other closed containers such as casseroles, either heated in an oven or over an open heating appliance or incorporating direct electric heating elements, tend to retain some moisture and flavour but being subject to direct heat have the disadvantage of possible local overheating or even burning of the food and loss of both moisture and food value by boiling over or by evaporation.

The devices known as "slow cookers" are an attempt to alleviate the burning problem inherent in casseroles by surrounding a cooking pot with an insulated jacket containing a very low powered electrical heating element, usually of the order of about 100–130 watts, or the same as an electric light bulb. Whilst such devices do retain moisture and flavour within the food, the very low heating power inevitably resuls in a long delay before the food reaches cooking temperature. During this long heat up period there is a high possibility of rapid reproduction of micro-organisms within the food, which in turn produce toxic by-products during their life and reproduction cycles. On reaching higher temperatures the micro-organisms are destroyed, but the toxic by-products can remain in the food, often giving rise to a characteristic 'taint' and pass into the digestive system of the consumer. This can be potentially hazardous to health, particularly in countries with low standards of food hygiene resulting in high levels of incipient bacteria in raw foods.

In the traditional method of cooking known as "Bain-Marie", the food is protected from direct heat by placing the food container in a shallow pan containing water which is then heated. This method is normally used only for low temperature cooking of delicate foods otherwise subject to being spoilt by overheating.

The invention has among its objects to provide a cooking vessel in which food can be cooked with an initial relatively rapid increase in temperature, without risk of burning and without undue loss of flavour of the food during cooking or spoiling of the food by drying.

It is also among the objects of the invention to provide a cooking vessel in which different foods can be cooked simultaneously with significant intermixing of the flavours of the different foods.

With these objects in mind and in accordance with the invention, a cooking vessel for oven cooking comprises an outer vessel to contain a quantity of water, an inner vessel to contain food, and a lid to close the outer vessel with the inner and the outer vessel and the lid relatively so shaped and located one with another as to form therebetween a space, and with the inner vessel and the lid relatively so shaped and disposed as to form a further space therebetween above food contained in the inner vessel, in which space, when the vessel is heated, a controlled release, circulation and recondensation of water vapour from the water contained in the outer vessel can occur, and in which further space, when the vessel is heated, a controlled release, circulation and re-condensation of further water vapour from the food contained in the inner vessel can occur, without undue mixing of the water vapour and further water vapour and without undue loss of the water vapour from the cooking vessel.

A cooking vessel according to the invention can protect the food from overheating during cooking whilst retaining moisture, flavour and food value, but also allowing for slow or rapid cooking as preferred. Special recipes have been prepared to take advantage of the improved yet simplified method of food preparation thus offered. Ancilliary components can be added to the vessel to make the fullest use of its unique cooking advantages.

BRIEF DESCRIPTION OF THE DRAWINGS

The invention is diagrammatically illustrated by way of example in the accompanying drawings, in which:

FIGS. 5 and 6 are further embodiments of cooking vessels according to the invention.

DETAILED DESCRIPTION

Figure 1:
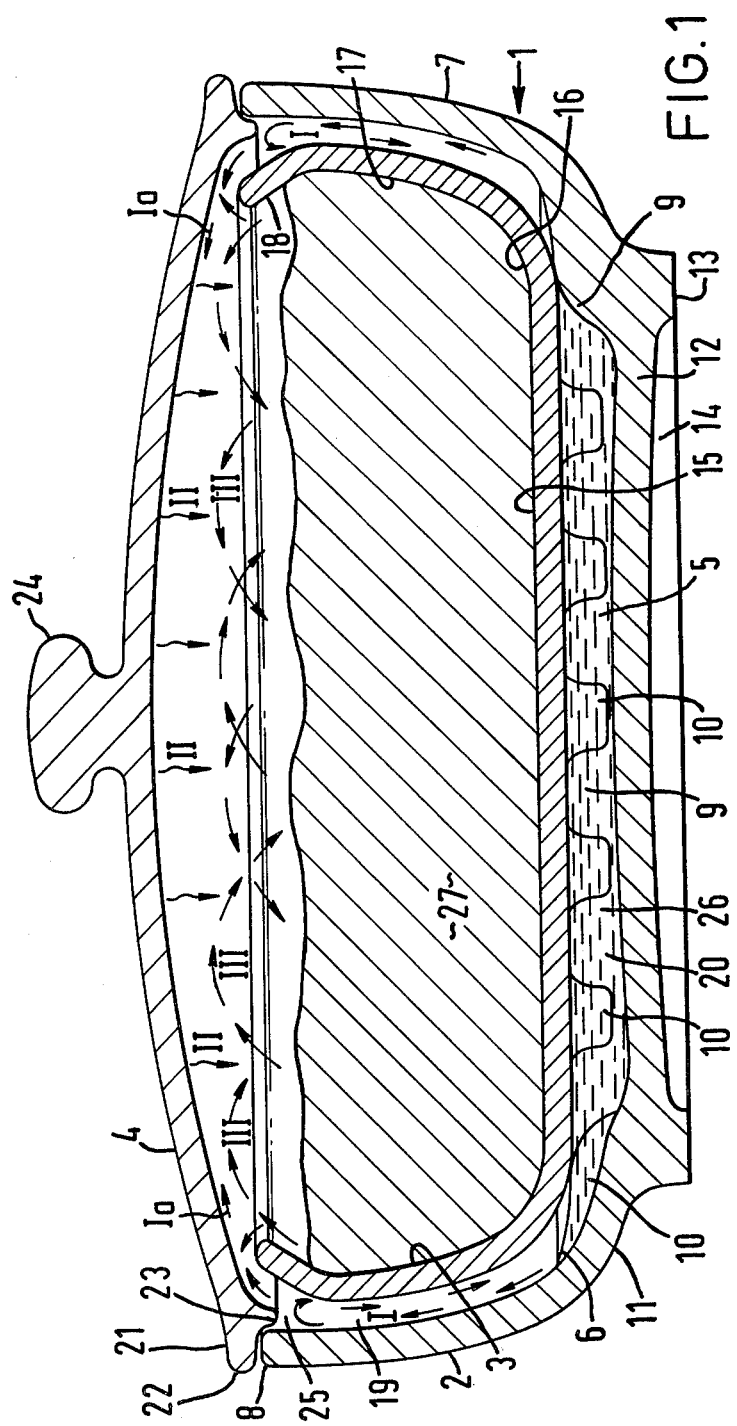
FIG. 1 is a sectional elevation of one embodiment of a cooking vessel according to the invention, also illustrating some of the operating principles.

Referring to FIG. 1, a cooking vessel 1, comprises an outer vessel 2, an inner vessel 3, and a lid 4, all preferably made of ceramic material.

The outer vessel 2 comprises an inner bottom well 5, blending at a curve 6 into a curved upstanding sidewall 7 with an upper edge. At the periphery of the bottom well 5 ribs 9 are provided spaced circumferentially and forming between them grooves 10 extending radially outwardly and upwardly toward the sidewall 7. The outer face of a lower portion 11 of the sidewall 7 blends radially inwardly and downwardly into a base 12 creating the outer form of the bottom well 5. The base 12 is preferably provided with a rim 13 forming a recess 14 to provide a stable support for the cooking vessel 1.

The approximate dimensions of the outer vessel 2 of the embodiment of FIG. 1 are advantageously 305 mm outer diameter, 105 mm high, and bottom well 5 being 185 mm lower internal diameter and 15 mm deep to the curve 6. The inner depth of the vessel 2 to the bottom well 5 is 90 mm and 75 mm to the curve 6 of the bottom well 5. The sidewall 7 and the base 12 are approximately 8 mm thick, increasing locally at the curve 6 to provide for the ribs 9, which are approximately 10 mm wide, and form the grooves 10 which are also approximately 10 mm wide.

The actual shape and numbers of the ribs 9 and grooves 10, and the thickness and form of the lower portion 11 of the sidewall 7 can be varied to suit production techniques and preferred appearance.

The inner vessel 3 has a substantially flat bottom portion 15, blending at a curved portion 16 into a curved upstanding sidewall 17 which terminates in an inwardly inclined circumferential lip 18. When placed inside the outer vessel 2, the curved portion 16 rests on the upstanding ribs 9 and the top lip 18 is approximately level with the upper edge 8 of sidewall 7 of vessel 2.

Preferably a gap 19 between the sidewall 7 and the sidewall 17 is approximately 5 mm wide and a space 20 between the bottom well 5 and the bottom portion 13 is approximately 13 mm. The wall thickness of the inner vessel 3 is approximately 7 mm. Advantageously, the volumetric capacity of the inner vessel 3 is approximately 6 pints.

An outer circumferential edge 21 of the lid 4 is provided with a flange 22 and a downwardly projecting ridge 23 which co-engage with the upper circumferential edge 8 of the outer vessel 2. The lid 4 preferably rises gently towards its centre to form a shallow dome. Advantageously, a knob 24 is provided to facilitate removal of the lid 4 from the outer vessel 1. The thickness of the lid 4 is approximately 8 mm. The effect of the ridge 23 of the lid 4 and the inwardly inclined lip 18 of the inner vessel 3 is to provide a further gap between the sidewall 17 and the inner face of the ridge 23 of the width substantially equal to the width of the gap 19, except for a spatial increase 25 immediately below the ridge 23.

The approximate thickness given for the outer vessel 2, the inner vessel 3 and the lid 4 are those preferred for hand-made examples, but substantial production economies can be made by reducing these thicknesses according to the production technique used without substantially affecting the cooking performance of the vessel.

In operation, a quantity of hot or cold water 26 is poured into the bottom well 5 of the outer vessel 2 so that the surface of the water is at the level of the top of grooves 10. Food 27 to be cooked is placed in the inner vessel 3, which is then lifted up and placed inside the outer vessel 2, advantageously by turning the fingers of both hands outwards and placing them under the inwardly inclined lip 18. It preferred a simple tool (not illustrated) can be used for lifting the inner vessel 3. The lid 4 is then placed in position and the cooking vessel 1 is ready for heating in an oven.

If preferred, the outer vessel 2 and the lid 4 can be preheated before the inner vessel 3 is introduced, or alternatively the oven can be pre-heated. The outer vessel 2 and the lid 4 rapidly attain the oven temperature to vapourise and keep vapourised some of the water 26. The vapour then circulates substantially as shown by arrows I within the gap 19 and, initially as shown by arrow Ia, under the lid 4 and over the top of the food 27, transferring heat gently to the inner vessel 3. Heat is also transferred gently through the bottom 15 by contact with the hot water 26, or the hot water vapour. Radiant heat is also transferred to the hot vapour Ia and to the food 27 from the hot lid 4 as shown by arrows II.

In practice, two of the essential features of cooking vessel 1 not achieved with conventional food steaming appliances or casseroles are that:

(a) little or no moisture is lost either from the food 27 or from the outer vessel 2

(b) little or no flavour is transferred from the food 27 to the water in the outer vessel 2, even when cooking highly flavoured foods such as curry.

This is achieved by the general design of the cooking vessel 1 and particularly by the inter-reaction on the hot vapour of the inwardly inclined circumferential lip 18 of the vessel 3 with the downwardly projecting circumferential ridge 23 of the lid 4 in turn creating the spatial increase 25 below the ridge 23 between the upper portions of the walls 17 and 7 of the inner vessel 3 and the outer vessel 2 respectively.

When the food is sufficiently hot, water vapour, shown by arrows III, given off by the food circulates over the top of the food but is largely unable to escape due to the layer of much hotter dryer water vapour Ia immediately beneath the lid, and by the hotter, dryer water vapour I trying to pass through the top of the gap 19 over the lip 18. Also the inward inclination of the lip 18 and the downwardly projecting ridge 23 of the lid 4 tends to constrain the water vapour III from the food under the lid 4.

In practice during several hours cooking very little moisture is lost either from the water charge 26 or from the food 27, and very little, if any taste of food is transferred to the water charge 26. The cooked food thus remains moist and retains its flavour and food value, and the gentle transfer of heat prevents overheating or burning of the food.

A big advantage is that little, if any water needs to be added to vegetables, and the food cooks in its own juices. If wine for example is used to further enhance flavour only a small quantity is needed, thus allowing economical, high quality cooking.

With higher cooking temperatures the radiant heat II from the hot lid 4 can be used to produce a light browning of the top surface of the food, thus giving a pleasing appearance to certain preparations. As it is not necessary to remove the lid for browning, the food is not caused to dry.

Figure 2:
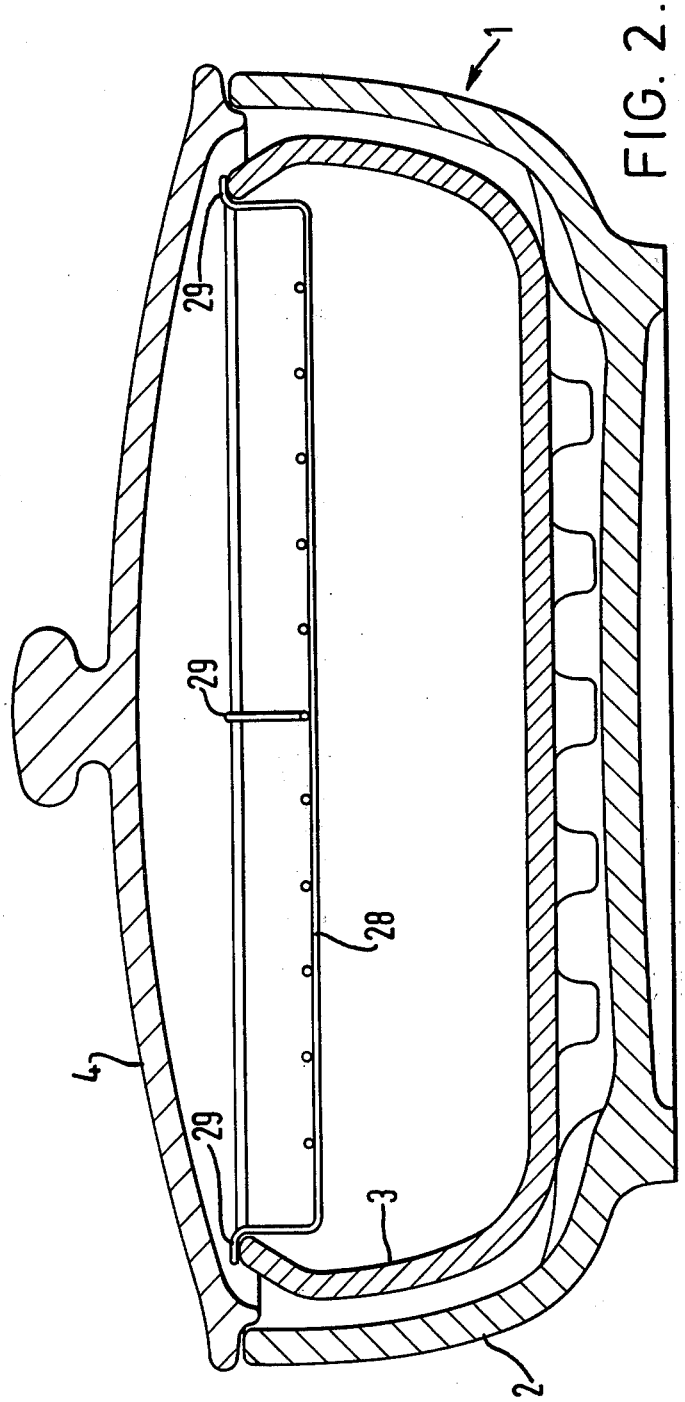
FIGS. 2, 3 and 4 show modifications and additions to the cooking vessel shown in FIG. 1.

Referring to FIG. 2, the inner vessel 3 is provided with a shallow basket 28 preferably made of stainless steel wire mesh. Circumferentially at intervals the wire ends are formed into hooks 29 to fit over the lip 18 of the inner vessel 3.

The basket is about 20 mm deep, and can be used to separate such foods as steak or fish from more moist foods being cooked in the lower part of the inner vessel, particularly when it is desired that the food to go in the basket should be lightly browned as well as remaining slightly drier. Deep or shallower baskets can be used and/or need only cover part of the inner vessel 3 as preferred.

Figure 3:
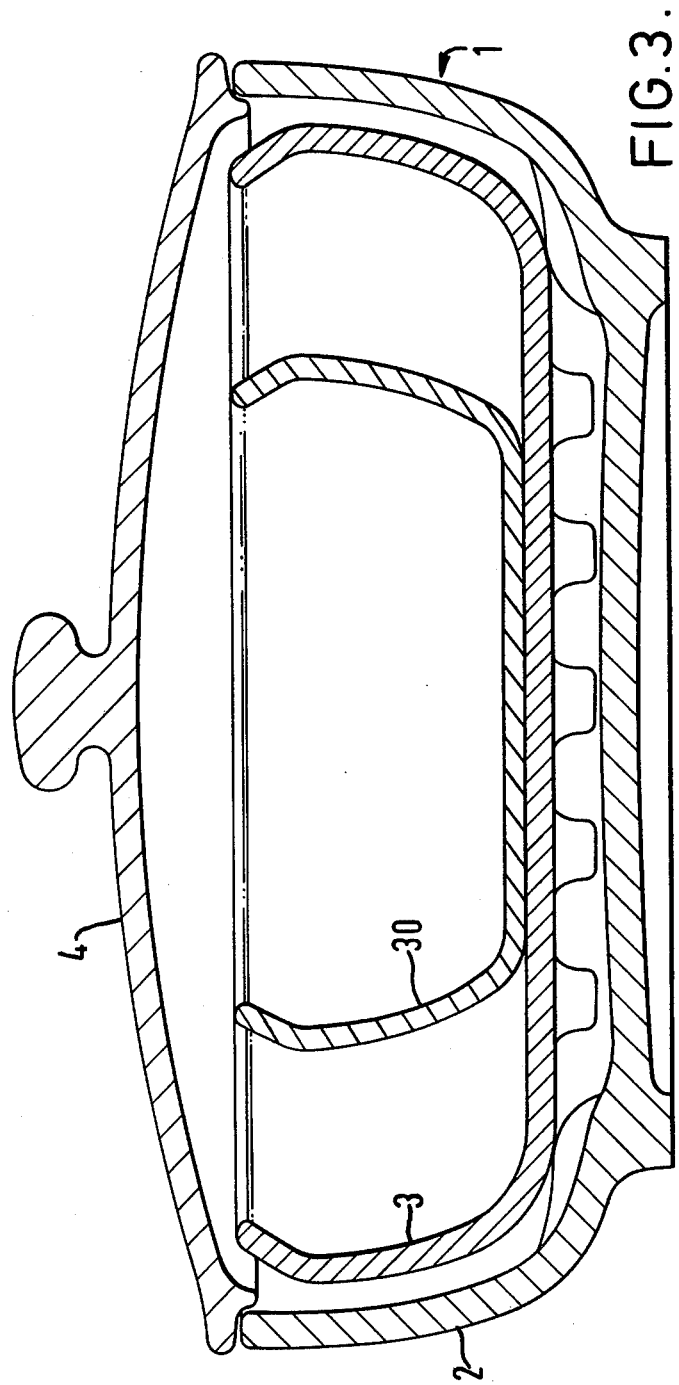

Referring to FIG. 3, a dish 30 of smaller diameter yet preferably of similar height to the inner vessel 3 is provided to lie within the vessel 3. This smaller dish 30 can be used positively to separate different foods being cooked at the same time, with one preparation in the inner vessel 3 and the other in the dish 30. An example of this is cooking rice in the dish 30 and cooking a sauce preparation such as Beef Strogonoff in the surrounding inner vessel 3.

Figure 4:
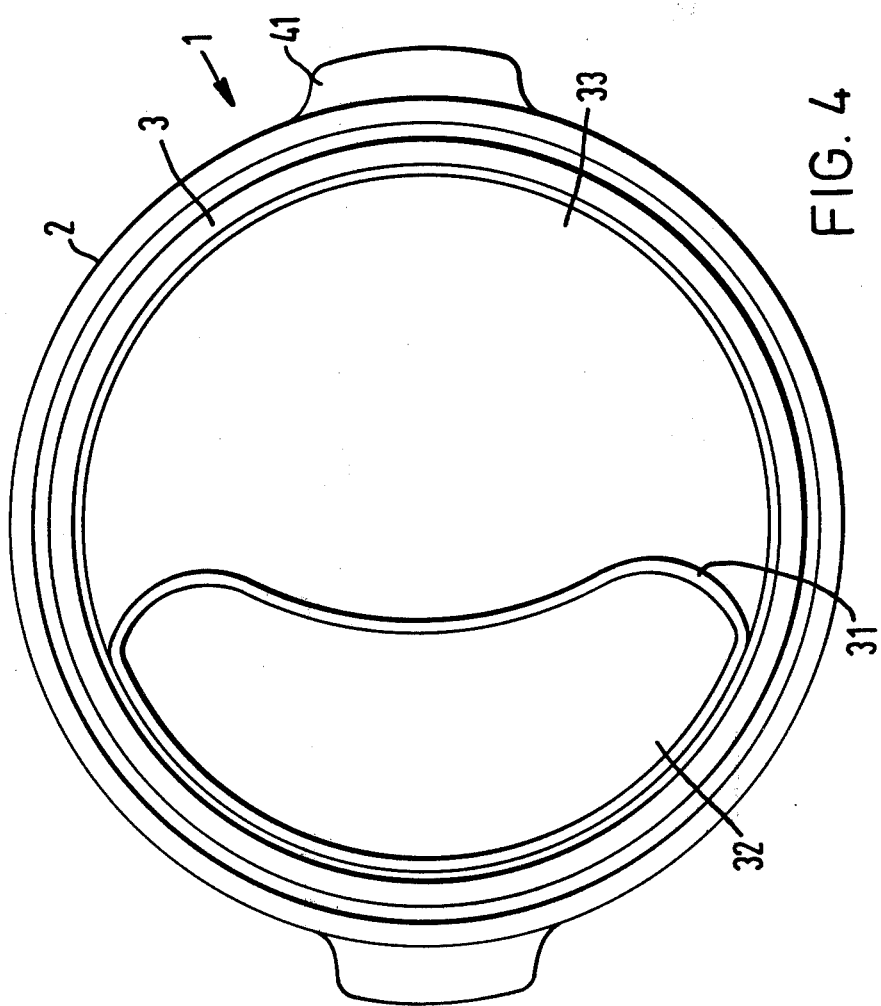

The inner dish 30 need not necessarily be of round shape to separate foods. For example, as shown in FIG. 4, a crescent-shaped smaller inner dish 31 can leave more conveniently shaped compartments 32 and 33 for separated foods. If desired, the inner vessel 3 could itself be divided diametrically into two halves, or divided in other ways to produce separate compartments of desired shape.

One of the advantages of separating foods is that a complete meal can be cooked, and also that in practice it is found that little if any, exchange of flavour between the separated foods takes place.

Figure 5:
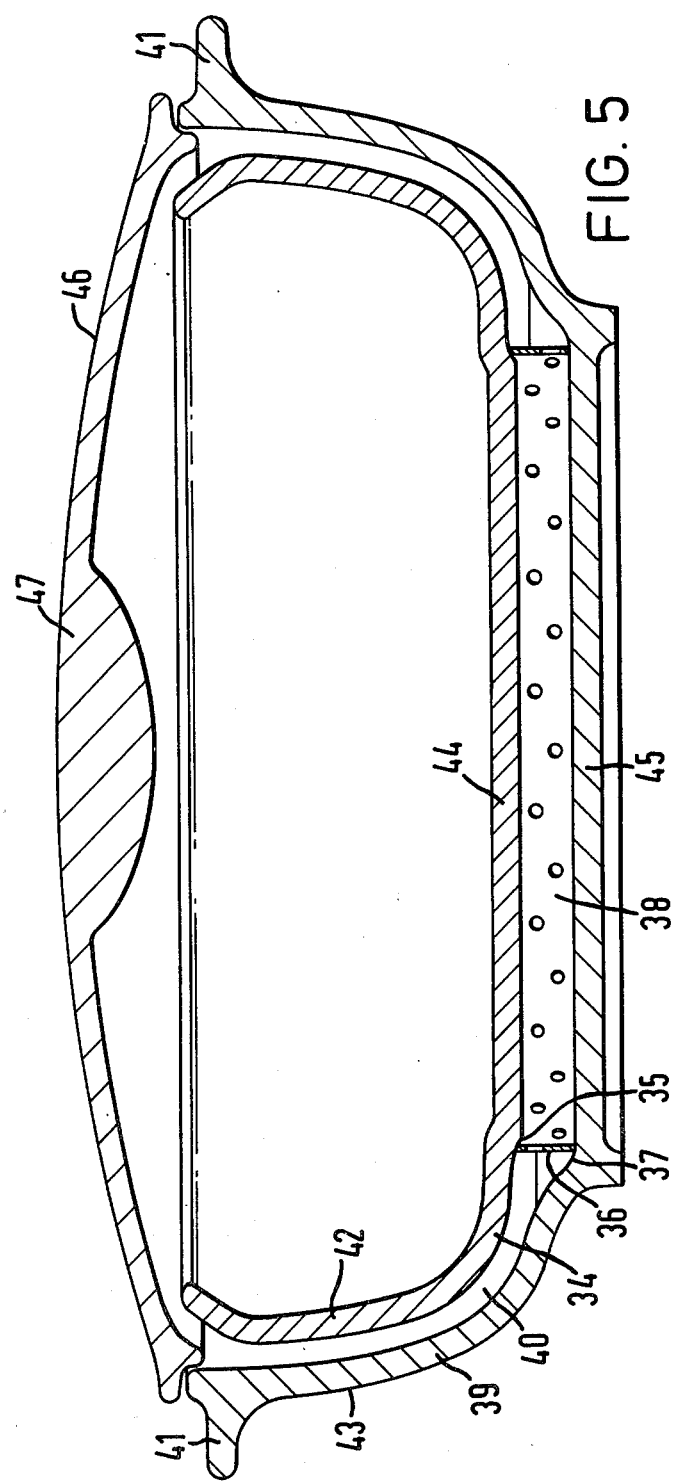

In the embodiment of FIG. 5, modifications to the basic design are shown to improve ease of handling, and provide versatility. An inner vessel 34 is provided with a small plinth 35 which locates over an annular support ring 36 advantageously formed from perforated stainless steel sheet. The lower edge of the ring 36 locates in a step 37 forming a bottom well 38 in an outer vessel 39. Water can be placed in the bottom well 38, the perforations in the ring 36 allowing the water and water vapour to pass into a gap 40 between the inner vessel 34 and the outer vessel 39. The ring 36 thus replaces the ribs 9 and grooves 10 of the embodiment of FIGS. 1 to 4.

When required, the inner vessel 34 and the support ring 36 can be removed, allowing the outer vessel 39 to be used as, for example, a large casserole, mixing bowl, punch bowl with no ribs 9 and grooves 10 in the outer vessel 2 requiring cleaning.

The outer vessel 39 is advantageously provided with handles or lugs 41 to facilitate handling.

The capacity of both the inner vessel 34 and the outer vessel 39 can be increased if desired by providing downwardly extending vertical portions of sidewalls 42 and 43 and outwardly extending bottom portions 44 and 45 of the inner vessel 34 and the outer vessel 39 respectively, of greater dimensions.

A lid 46 is provided with a recessed handle 47 with the result that the cooking vessel of FIG. 5 can be of lower overall height, thus using up only a small space in an oven.

The embodiment illustrated in FIG. 6 combines low overall height to economise on oven space with further improvements for handling while still permitting additional uses as with the embodiment of FIG. 5.

An outer vessel 48 is provided with a series of indentations 49 preferably four in number at equal intervals around the lower edge. The indentations 49 can serve as handgrips for ease of lifting and handling the cooking vessel. Grooves (not shown) located intermediate the indentations in a support surface 50 for an inner vessel 51 provide vapour passages from a bottom well 52 to a peripheral gap 53.

A lid 54 is similar in function to those already described but by incorporating lifting lugs or handles 55 can retain low overall height with greater ease of handling.

Preferably the cooking vessel is made of oven-resistant ceramic material, but other materials such as cast iron or aluminum could be used. Advantageously, the sizes given in the above examples are designed to fit comfortably into a standard domestic oven. Other shapes, such as oval, and other sizes could be used, as well as combinations of features of the embodiments illustrated.

Another feature of the cooking vessel is its capacity for retaining heat, and therefore keeping food hot whilst waiting to be served. Advantageously, the complete cooking vessel is placed on the serving table, with the hot water remaining in the bottom of the outer vessel, the food keeping hot for about an hour.

Cooking vessels according to the invention have been tested both by housewives and by professional cooks engaged in gas appliance sales promotion, the results verify the claimed advantages over other cooking vessels.

Cooking vessels according to the invention can obviously also be used in micro-wave ovens and, if to be so used, are constructed of material suitable for such ovens such as certain types of plastics material. The cooking vessel, when so used, retains the cooking advantages outlined above with the advantage of shorter cooking time and energy saving. The browning effect on food obtained in the cooking vessels in conventional ovens can be obtained in micro-wave ovens by coating the lid of the cooking vessel in known manner with a known material so that the micro-waves induce a radiative heating effect from the lid onto the upper surface of the food thereby to brown said upper surface. The sizes of the cooking vessels can be varied to suit sizes of cookers, and particularly may be provided in an individual size, that is to say suitable for cooking a meal for one person. For micro-wave cooking the cooking vessel can be constructed in lighter section material and can use a smaller water charge due to the different heating characteristics of micro-wave cooking, that is to say more rapid heating.

What is claimed is:

1. A cooking vessel for oven cooking comprising an outer vessel to contain a quantity of water, an inner vessel to contain foods, and a lid to close said outer vessel, wherein said outer vessel is formed with a well at its lower end, support means are provided in said outer vessel for supporting said inner vessel above said well with the outer face of a sidewall of said inner vessel spaced inwardly from the inner face of a sidewall of said outer vessel to provide an annular gap and with passages communicating said well with said annular gap; said inner vessel and said outer vessel and said lid are relatively so shaped and located one within another as to form therebetween a space of which space said annular gap forms a part; said inner vessel and said lid are relatively so shaped and disposed as to form a further space therebetween above food contained in said inner vessel; and wherein, when said cooking vessel is heated in an oven, a controlled release, circulation and re-condensation of water vapor from said water contained in said outer vessel occurs in said space and a controlled release, circulation and re-condensation of further water vapor from said food contained in said inner vessel occurs in said further space, with relatively little mixing of said water vapor and said further water vapor and without undue loss of said water vapor from said cooking vessel, after initial heating of said outer vessel and lid in the oven.

2. A cooking vessel as claimed in claim 1, wherein said support means comprise circumferentially spaced shaped projections integral with said outer vessel.

3. A cooking vessel as claimed in claim 1, wherein said support means comprise a removable annular member with perforations therein and said well of said outer vessel and a lower portion of said inner vessel are shaped to provide desired location of said annular member in said well and of said inner vessel on said annular member.

4. A cooking vessel as claimed in claim 1, wherein said lid is slightly domed, has a flange to rest on an upper edge of said sidewall of said outer vessel and a downwardly depending ridge to engage within said outer vessel.

5. A cooking vessel as claimed in claim 4, wherein said sidewall of said inner vessel is inclined inwardly at its upper end, which said upper end is at substantially the same level as said upper edge of said sidewall of said outer vessel, the outer face of said inwardly inclined portion of said sidewall of said inner vessel is spaced from the inner face of said ridge of said lid to provide a further annular gap of substantially the same width as said annular gap, and said ridge of said lid has a cross section such that at the junction of said annular gap and said further annular gap there is a spatial increase immediately below said ridge.

6. A cooking vessel as claimed in claim 1, wherein the interior of said inner vessel is subdivided into separate compartments.

7. A cooking vessel as claimed in claim 1, wherein separate compartments are formed in said inner vessel by one or more additional vessels placed within said inner vessel.

8. A cooking vessel as claimed in claim 1, further including a basket suspended within said inner vessel.

9. A cooking vessel as claimed in claim 1, wherein said outer vessel, said inner vessel and said lid are formed of a ceramic material.

10. A cooking vessel for oven cooking comprising, in assembled relationship, an outer vessel to contain a quantity of water in a well at the lower end thereof, an inner vessel to contain food, said inner vessel being supported above said well and having an inwardly inclined peripheral lip at its upper end, and a lid to close said outer vessel, said inner vessel and lid being relatively shaped and disposed to form a space therebetween above food contained in said inner vessel, and said inner vessel and outer vessel being relatively shaped to form between respective outer and inner, substantially parallel side faces thereof a narrow annular gap open at its lower end to said well and at its upper end to said space through an annular passage exteriorly adjacent said inclined lip of said inner vessel, such that upon heating of said vessel in an oven, a controlled release, circulation and re-condensation of water vapor from water contained in said well occurs in said narrow annular gap and a controlled release, circulation and re-condensation of further water vapor from food contained in said inner vessel occurs in said space, with relatively little mixing of said water vapor and further water vapor and without undue loss of water vapor from said cooking vessel, after initial heating of said outer vessel and lid in the oven.

11. A cooking vessel as claimed in claim 10, wherein said annular passage at its lower end open to said annular gap has a width substantially greater than said annular gap and at its upper end open to said space has a width substantially the same as said annular gap.

12. A cooking vessel as claimed in claim 11, wherein the upper edge of said inclined lip is at substantially the same level as the upper edge of said outer vessel, and said lid is slightly domed, has a flange resting on the upper edge of said outer vessel and has a downwardly depending ridge to engage within said outer vessel.

13. A cooking vessel as claimed in claim 12, wherein the inner face of said outer vessel adjacent its upper edge is spaced from the outer face of said inclined lip and defines therewith immediately below said ridge said lower end of said annular passage.

14. A cooking vessel as claimed in claim 13, wherein the inner face of said ridge is spaced from the outer face of said inclined lip and defines therewith said upper end of said annular passage.

15. A cooking vessel as claimed in claim 10, wherein support means are provided in the bottom of said outer vessel to support said inner vessel above said well and with passages communicating said well with the lower end of said annular gap.

* * * * *